US006789096B2

(12) United States Patent
Sankaran et al.

(10) Patent No.: US 6,789,096 B2
(45) Date of Patent: Sep. 7, 2004

(54) REAL TIME SESSIONS IN AN ANALYTIC APPLICATION

(75) Inventors: Mohan Sankaran, Union City, CA (US); Sanjeev K. Gupta, Sunnyvale, CA (US); Sen Ma, San Jose, CA (US)

(73) Assignee: Informatica Corporation, Palo Alto, CA (US)

( * ) Notice: Subject to any disclaimer, the term of this patent is extended or adjusted under 35 U.S.C. 154(b) by 258 days.

(21) Appl. No.: 09/891,818

(22) Filed: Jun. 25, 2001

(65) Prior Publication Data

US 2002/0198902 A1 Dec. 26, 2002

(51) Int. Cl.[7] ............................................. G06F 17/30
(52) U.S. Cl. ........................... 707/203; 707/10; 707/4; 707/100; 707/101; 707/103
(58) Field of Search ................... 707/4, 102, 5, 707/9, 100, 101, 200, 103, 7, 10, 6, 104, 203

(56) References Cited

U.S. PATENT DOCUMENTS

| | | | |
|---|---|---|---|
| 5,794,246 A | * 8/1998 | Sankaran et al. | 707/101 |
| 6,014,670 A | * 1/2000 | Zamanian et al. | 707/101 |
| 6,032,158 A | * 2/2000 | Mukhopadhyay et al. | 707/201 |
| 6,044,374 A | * 3/2000 | Nesamoney et al. | 707/10 |
| 6,208,990 B1 | * 3/2001 | Suresh et al. | 707/6 |
| 6,339,775 B1 | * 1/2002 | Zamanian et al. | 707/101 |
| 6,438,552 B1 | * 8/2002 | Tate | 707/10 |
| 6,449,619 B1 | * 9/2002 | Colliat et al. | 707/102 |
| 6,549,910 B1 | * 4/2003 | Tate | 707/102 |
| 6,553,366 B1 | * 4/2003 | Miller et al. | 707/2 |

OTHER PUBLICATIONS

Anonymous: "Comaq's Zero Latency Enterprise Initiative" 24X7 The Magazine of Nonstop Computing, vol. 1, No. 2, (Oct. 2000), pp. 1–25, XP002236415 USA, p. 1, paragraph 1 p. 25, last paragraph.
Bello R.G. et al.: Materialized views in Oracle Proceedings of the Int'l Conference on Very Large Data Bases, XX, XX Aug. 24, 1998, pp. 659–664 XP002233164, p. 659, left–hand column, paragraph 1, right–hand column, paragraph 2.
Chaudhuri S. et al.: "An overview of Data Warehousing and OLAP Technology" Sigmod Record, Sigmod, New York, NY, US, vol. 26, No. 1, Mar. 1997, pp. 65–74, XP002193792 ISSN: 0153–5808, p. 68, left–hand column, paragraph 2 right–hand column, paragraph.

* cited by examiner

Primary Examiner—Jean M. Corrielus

(57) ABSTRACT

A method and system thereof for performing real time transformations of dynamically increasing databases is described. A session, identified as a real time session, is initialized. The real time session repeatedly executes a persistent (e.g., continually running) data transport pipeline of the analytic application. The data transport pipeline extracts data from a changing database, transforms the data, and writes the transformed data to storage (e.g., a data warehouse or data mart). The data transport pipeline is executed at the end of each time interval in a plurality of contiguous time intervals occurring during the real time session. The data transport pipeline remains running after it is executed, until the real time session is completed. Accordingly, new data are transformed in a timely manner, and processing resources are not consumed by having to repeatedly re-establish (re-initialize) the data transport pipeline.

18 Claims, 5 Drawing Sheets

REAL TIME SESSIONS IN AN ANALYTIC APPLICATION

FIELD OF THE INVENTION

The present invention relates to database management systems. More specifically, the present invention pertains to a method for real time processing of a dynamically increasing computer database used in an analytic application.

BACKGROUND OF THE INVENTION

Computers are used to perform a wide variety of applications in such diverse fields as finance, traditional and electronic commercial transactions, manufacturing, health care, telecommunications, etc. Most of these applications typically involve inputting or electronically receiving data, processing the data according to a computer program, then storing the results in a database, and perhaps transmitting the processed data to another application, messaging system, or user in a computer network. As computers became more powerful, faster, and more versatile, the amount of data that could be processed correspondingly increased.

Furthermore, the expanding use of "messaging systems" enhances the capacity of networks to transmit current operational data and to provide interoperability between disparate database systems. Messaging systems are computer systems that allow logical elements of diverse applications to seamlessly link with one another. Messaging systems also provide for the delivery of data across a broad range of hardware and software platforms and allow applications to interoperate across network links despite differences in underlying communications protocols, system architectures, operating systems, and databases services.

Prior Art FIG. 1 illustrates the characteristics of the various environments in which data processing can occur. The types of environments are characterized according to whether they operate on a batch basis or on a transactional basis (that is, whether data are operated on in bulk, or handled in smaller quantities such as a per transaction basis). The types of environments are also characterized according to whether the data need to be operated on in real time (e.g., essentially right away) or whether some latency in the processing can be tolerated.

Prior Art FIG. 1 shows ETL (extraction/transformation/loading) space 1, EAI (enterprise application and integration) space 2, B2B (business-to-business) space 3, and process integration space 4. ETL space 1 is characterized by large amounts of data handled in bulk, with some degree of latency occurring between the time data are received and the time processing of the data is completed. EAI space 2 is characterized by smaller amounts of data handled essentially in real time. B2B space 3 is characterized as handling larger amounts of data than that of EAI space 2 in essentially real time. However, the amount of data handled in B2B space 3 is generally not as large as that handled in ETL space 1. Process integration space 4 primarily deals with the integration of business processes handling smaller amounts of data with some degree of associated latency. Of particular interest to the discussion herein are ETL space 1 and EAI space 2.

In ETL space 1, large amounts of data exist in operational databases. The raw data found in the operational databases often exist as rows and columns of numbers and codes which, when viewed by individuals, may appear bewildering and incomprehensible. Furthermore, the scope and vastness of the raw data stored in modern databases can be overwhelming. Hence, analytic applications were developed in an effort to help interpret, analyze, and compile the data so that it may be readily and easily understood. This is accomplished by transforming (e.g., sifting, sorting, and summarizing) the raw data before it is presented for display, storage, or transmission. The transformed data are loaded into target databases in a data warehouse or data mart. Individuals can access the target databases, interpret the transformed data, and make key decisions based thereon.

An example of the type of company that would use data warehousing is an online Internet bookseller having millions of customers located worldwide whose book preferences and purchases are tracked. By processing and warehousing this data, top executives of the bookseller can access the processed data from the data warehouse, which can be use to make sophisticated analysis and key decisions on how to better serve the preferences of their customers throughout the world.

One problem generally associated with transforming data for a data mart or data warehouse is that, because of the huge amounts of data to be processed, it can take a long time to perform. For the purpose of efficient utilization of computer resources, the transformation of data is normally conducted in a "batch" mode. Operational data are collected for a period of time and then extracted, transformed, and loaded into data warehouses/marts by the analytic application.

For example, sales data may be collected in the operational database for an entire week, processed by the database application in one continuous session over the weekend, and then aggregated into a target database stored in the data warehouse. The target database may reflect, for example, summary year-to-date sales by geographic region. The data warehouse storing the year-to-date sales data is updated only when all individual data accumulated for the previous week have been extracted and transformed. Between updates or even during an update session, end-users accessing the data warehouse will be presented with data from the target database current only to the previous week's update. Data accumulating for the next session's processing batch will not be reflected in the target database.

Thus, the batch mode of operation for processing data in ETL space 1 of Prior Art FIG. 1 can be problematic because of the latency between the time raw data are received and the time at which transformed data are ready for evaluation by end-users. The latency issue is compounded as large amounts of new operational (raw) data are frequently received for input into the data mart or data warehouse, in particular with the advent of messaging systems. However, the new data are not considered until the next time the target databases are updated.

In EAI space 2, data are more transactional in nature and thus the quantities of data requiring processing are smaller than quantities of data processed in ETL space 1. Accordingly, in EAI space 2, data can be processed essentially in real time (in essence, as the transaction occurs).

The boundaries between ETL space 1 and EAI space 2 are blurring, as end-users indicate their preference for processing large amounts of data (as in ETL space 1) with real time speed (as in EAI space 2). In addition, some applications driven from a data warehouse require constant and frequent updates of the data warehouse. To satisfy these objectives, it is becoming more common to shorten the period of time between target database updates in ETL space 1. That is, update sessions in the batch mode are run on a more frequent basis in an attempt to simulate real time processing.

However, there is a large computational cost associated with running update sessions more frequently in the batch mode. To launch a session, data transformation pipelines generally need to be established, caches and other data structures need to be built, and relevant data need to be identified, retrieved and used to prime (initialize) the data transformation pipelines and to populate the caches and other data structures. These tasks can consume a portion of the user's time, and also they can consume a measurable portion of a computer system's available resources. The difficulty of simulating real time processing is increased by the need to complete these tasks within a short period of time. In essence, an update session must be initiated and executed within a time window that has been specified to be small enough to simulate real time processing.

Another problem with running updates sessions more frequently is that, although in some aspects it may appear to simulate real time, in actuality processing is not occurring in real time. However, data sources (such as messaging systems) coupled to the ETL application may actually be running in real time. As such, running updates more frequently does not take full advantage of the real time capabilities of current messaging systems.

Accordingly, what is needed is a method and/or system that can process (transform) large amounts of operational (raw) data and store the transformed data in a target database (data warehouse/mart) essentially in real time, but without incurring the cost in computational resources and user time required by running update sessions more frequently, as in the prior art. The present invention provides a novel solution to this need.

SUMMARY OF THE INVENTION

The present invention provides a method and system that can process (transform) large amounts of operational (raw) data and store the transformed data in a target database (data warehouse/mart) essentially in real time, without incurring the cost in computational resources and user time required by running update sessions more frequently. The present invention solves the problem of inadequate timeliness of data stored in prior art database transformation systems by providing a method and system for incremental transformation of dynamically increasing database data sets essentially in real time.

A method and system thereof for performing real time transformations of dynamically increasing databases are described. A session, identified as a real time session, is initialized. The real time session repeatedly executes a persistent (e.g., continually running) data transport pipeline of the analytic application.

In the present embodiment, during the real time session, the data transport pipeline repeatedly extracts data from a changing database, transforms the data, and writes the transformed data to storage (e.g., a data warehouse or data mart). The data transport pipeline is executed at the end of each time interval in a plurality of contiguous time intervals occurring during the real time session.

More simply stated, in one embodiment, a latency time period is specified by a user. The real time session is essentially divided into a series of time intervals, each interval equal to the latency time period. At the end of each interval, the data transport pipeline is executed ("flushed"). Thus, in each interval, data are extracted from the operational data base, transformed, and loaded into a target database. The data transport pipeline remains running, even after it is executed, until the real time session is completed.

Accordingly, new data are transformed in a timely manner, and processing resources and the user's time are not consumed by having to repeatedly re-establish (re-initialize) the data transport pipeline.

BRIEF DESCRIPTION OF THE DRAWINGS

The present invention is illustrated by way of example, and not by way of limitation, in the figures of the accompanying drawings and in which like reference numerals refer to similar elements and in which.

Prior Art

DETAILED DESCRIPTION

Figure 1:
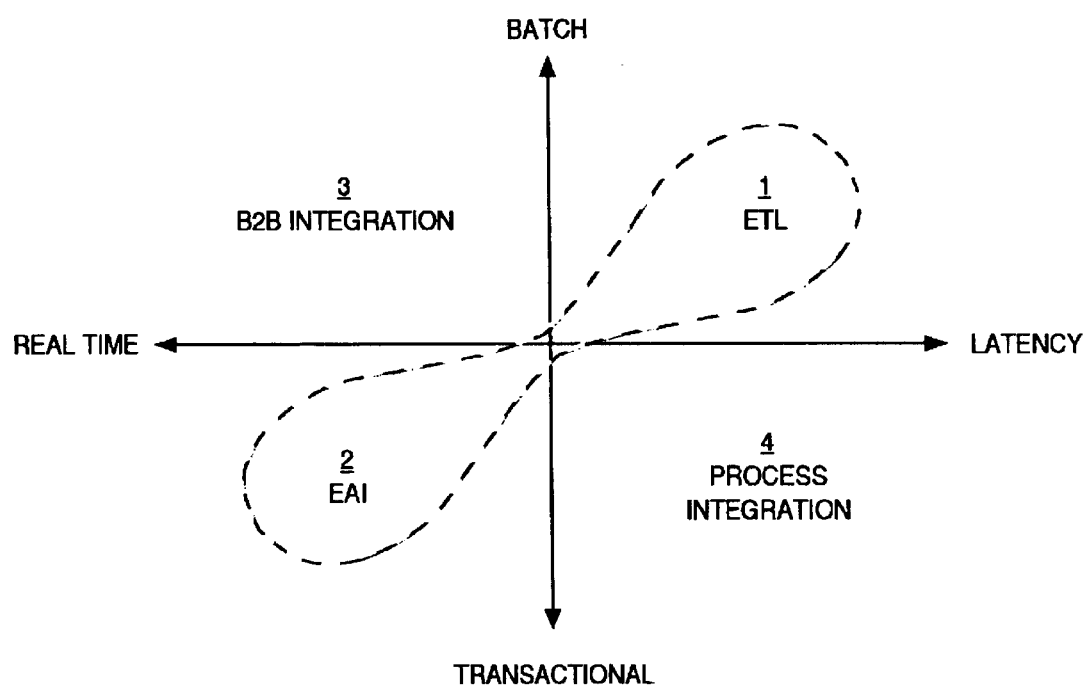
FIG. 1 illustrates characteristics of various prior art data processing environments.

A method and system for incrementally transforming in real time a dynamically changing operational database are described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Notation and Nomenclature

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "transforming," "writing," "reading," "extracting," "loading," "executing," "initializing," "receiving," "determining," "aggregating," "storing," "returning," "committing" or the like, refer to the actions and processes (e.g., process 500 of FIG. 5) of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Data transport operations extract data from the source database, transform the data, and load the transformed data into a target database. The terms "data transport" and "data transportation" as used herein include data extraction, transformation (processing), and loading. "Target databases" (or "target tables") are data warehouses and/or data marts into which transformed data are loaded.

The term "pipeline" as used herein refers to an architecture for data transport (e.g., data extraction, transformation, and storage). Accordingly, the execution of a pipeline can read data, transform the data, and load (or commit) transformed data into one or more target databases. Further information regarding the use of pipelines is provided in the U.S. Patent Application entitled "Method and Architecture for Automated Optimization of ETL Throughput in Data Warehousing Applications," with Ser. No. 09/116,426 and filing date Jul. 15, 1998, assigned to the assignee of the present invention and hereby incorporated by reference (ETL refers to extraction/transformation/loading).

As used herein, a "session" initializes and executes a data transport pipeline. That is, a session results in the execution of the steps of extracting (reading) data, transforming the data according to an analytic application, and storing (loading) the transformed data (e.g., in a data warehouse). A session can include one or more pipelines. Multiple sessions can occur in parallel (e.g., multiple users executing pipelines in parallel) or in series. As will be seen, in a "real time" session in accordance with the present invention, the data transport pipeline is executed multiple times at specified time intervals.

Exemplary Computer System Platform

Figure 2:
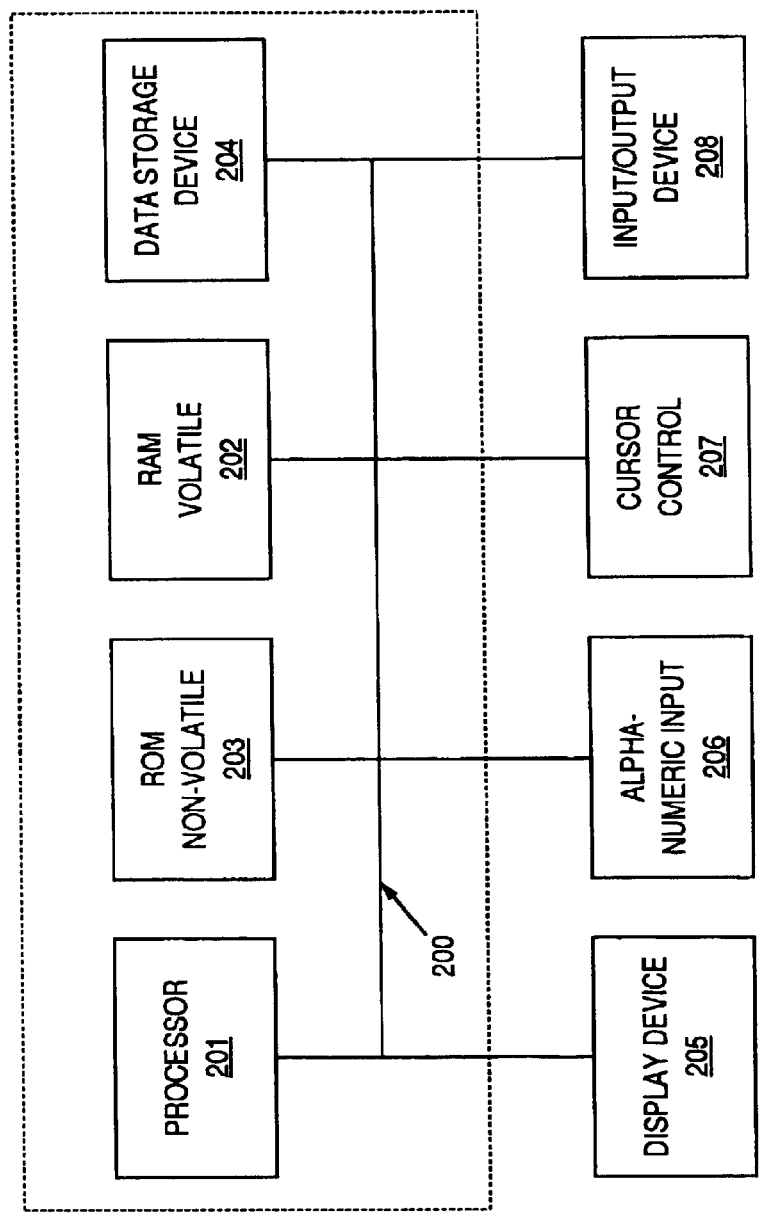
FIG. 2 is a block diagram of an exemplary computer system upon which embodiments of the present invention may be practiced.

Refer now to FIG. 2 which illustrates an exemplary computer system 290 upon which embodiments of the present invention may be practiced. In general, computer system 290 comprises bus 200 for communicating information, processor 201 coupled with bus 200 for processing information and instructions, random access (volatile) memory (RAM) 202 coupled with bus 200 for storing information and instructions for processor 201, read-only (non-volatile) memory (ROM) 203 coupled with bus 200 for storing static information and instructions for processor 201, data storage device 204 such as a magnetic or optical disk and disk drive coupled with bus 200 for storing information and instructions, an optional user output device such as display device 205 coupled to bus 200 for displaying information to the computer user, an optional user input device such as alphanumeric input device 206 including alphanumeric and function keys coupled to bus 200 for communicating information and command selections to processor 201, and an optional user input device such as cursor control device 207 coupled to bus 200 for communicating user input information and command selections to processor 201. Furthermore, an optional input/output (I/O) device 208 is used to couple computer system 290 to a network, another computer system, or the like.

Display device 205 utilized with computer system 290 may be a liquid crystal device, cathode ray tube, or other display device suitable for creating graphic images and alphanumeric characters recognizable to the user. Cursor control device 207 allows the computer user to dynamically signal the two-dimensional movement of a visible symbol (pointer) on a display screen of display device 205. Many implementations of the cursor control device are known in the art including a trackball, mouse, joystick or special keys on alphanumeric input device 206 capable of signaling movement of a given direction or manner of displacement. It is to be appreciated that the cursor control 207 also may be directed and/or activated via input from the keyboard using special keys and key sequence commands. Alternatively, the cursor may be directed and/or activated via input from a number of specially adapted cursor directing devices.

Exemplary Data Transport Pipeline

Figure 3:
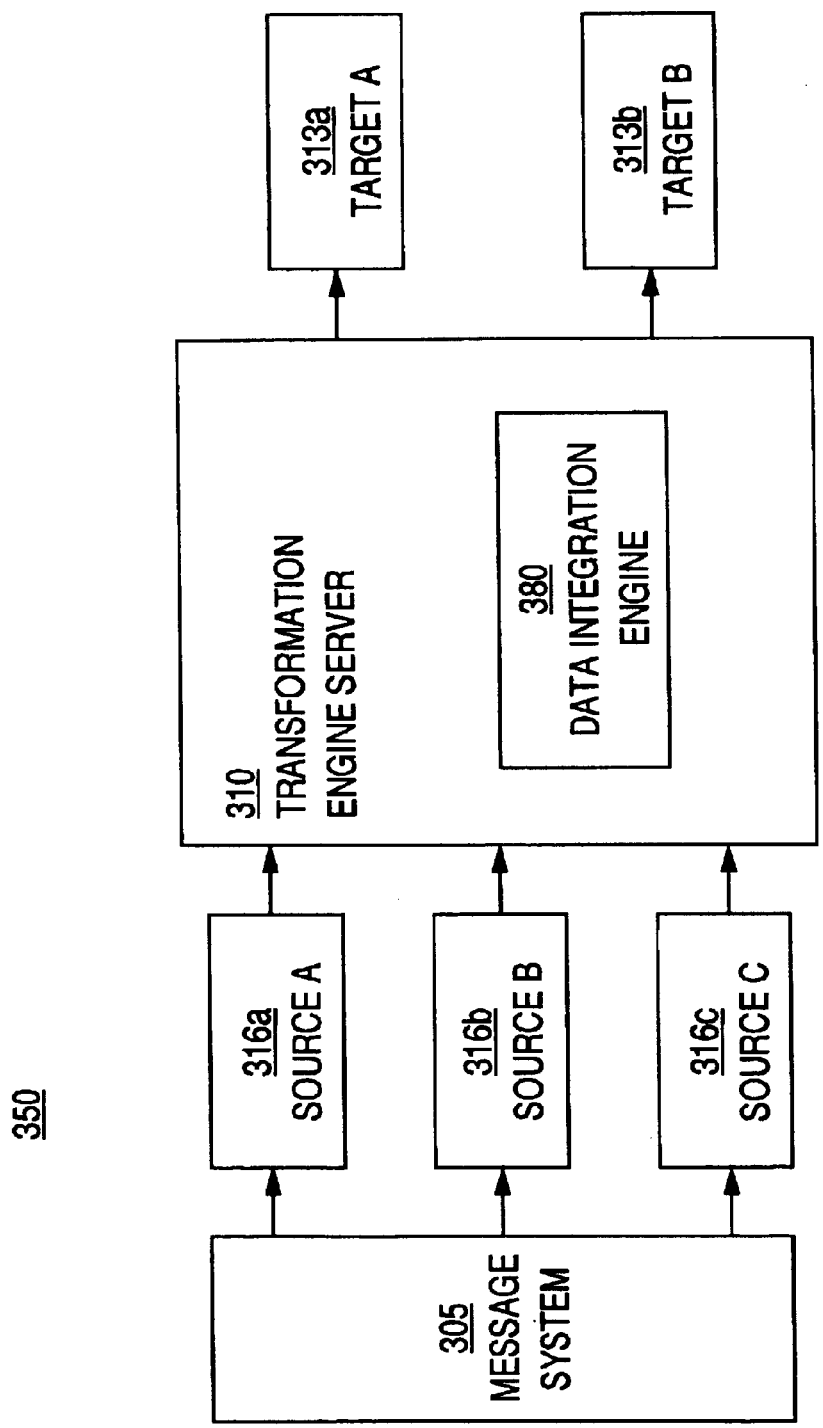
FIG. 3 is a block diagram of an exemplary data transport pipeline in accordance with one embodiment of the present invention.

FIG. 3 illustrates an exemplary data transport pipeline 350 upon which embodiments of the present invention may be practiced. In the present embodiment, data transport pipeline 350 is executed on transformation engine server 310. In one embodiment, transformation engine server 310 can include one or more microprocessors which run an operating program (such as Windows NT, UNIX, or the like). Transformation engine server 310 is exemplified by computer system 290 of FIG. 2.

In FIG. 3, operational databases 316a, 316b, and 316c (sources A, B and C, respectively) store "raw" data that are to be transformed for the data warehouse/mart (e.g., raw data resulting from business and financial transactions, equipment performance logs, etc.). The databases 316a–c can be any of the conventional Relational Database Management Systems (RDBMS) (such as from Oracle, Informix, Sybase, Microsoft, etc.) that reside within a high capacity mass storage device (such as hard disk drives, optical drives, tape drives, etc.). The operational databases 316a–c can reside on transformation engine server 310 or they can reside in a separate computer system or mass storage device.

Raw data received and stored within operational databases 316a–c are transformed by an analytic application (e.g., data integration engine 380) into information that is more meaningful for decision support. Databases 313a and 313b (targets A and B, respectively) are the data warehouses or data marts that are the targets of the data transportation process. Data marts/warehouses 313a and 313b include transformed data processed by the analytic application. The target databases 313a–b can reside on transformation engine server 310 or they can reside in a separate computer system or mass storage device.

Data integration engine 380 is a functional element that can be implemented in software and/or hardware for performing data transport operations. In the present embodiment, data integration engine 380 is a software program, operable on transformation engine server 310, that performs data transport operations.

Data integration engine 380 can extract (read) data from source databases 316a, 316b, and 316c and store (write) the extracted source data, when storage is required, in the memory storage of transformation engine server 310. Data integration engine 380 can also transform the source data using transformation components implemented by data integration engine 380. Data integration engine 380 can then write the transformed data to target databases 313a and 313b.

In one embodiment, there are thirteen different transformation components: source, target, expression, aggregation, filter, rank, update strategy, sequence, joiner, lookup, stored procedure, external procedure, and normalizer. The source transformation contains tables, views, synonyms, or flat files that provide data for the data mart/data warehouse. The target transformation maintains database objects or files that receive data from other transformations. These targets then make the data available to data mart users for decision support. Expression transformations calculate a single result, using values from one or more ports. The aggregation transformation calculates an aggregate value, such as a sum or average, using the entire range of data within a port or within a particular group. Filter transformations filter (selects) records based on a condition the user has set in the expression. The rank transformation filters the top or bottom range of records, based on a condition set by the user. The update strategy transformation assigns a numeric code to each record indicating whether the server should use the information in the record to insert, delete, or update the target. The sequence generator transformation generates unique identification numbers. The joiner transformation joins records from different databases or file systems. The lookup transformation looks up values. The stored procedure transformation calls a stored procedure. The external procedure transformation calls a procedure in a shared library or in the Component Object Model (COM) layer of Windows NT. The normalizer transformation normalizes records, including those read from virtual storage access method (VSAM) sources.

In the present embodiment, the source, target, aggregation, rank, and joiner transformations are all staged transformations. The lookup transformation also becomes a staged transformation when caching is turned on. The data generated by these transformations are automatically staged by the software, without human intervention. The expression, filter, update strategy, sequence, stored procedure, external procedure, and normalizer transformations are all streamed transformations. Other types of transformations can also be added to this list.

In one embodiment, the data transport pipeline 350 functions with a message system 305 that has real time capability. Accordingly, message system 305 provides new data to operational databases 316a–c in real time, perhaps continuously, as new data are available. Such messaging systems, including but not limited to Tibco, IBM MQ, or Microsoft message queue, are known in the art.

In accordance with the present invention, data transport pipeline 350 executes in a real time mode. In one embodiment, a "latency time period" is specified. In effect, a session is divided into a series of contiguous time intervals, each time interval equal to the latency time period. At the end of each time interval (that is, upon expiration of the latency time period), data transport pipeline 350 is executed. Thus, the latency time period is used to drive the data transformation process of the data transport pipeline 350 in the real time mode.

In the real time mode, data transport pipeline 350 (e.g., data integration engine 380) is continuously running. That is, in a real time session, the data transport pipeline 350 remains up and running even after the data transport function is executed at the end of each latency time period. In the real time mode, data are in effect trickled through exemplary data transport pipeline 350. As a result, in the real time mode, there is not a need to repeatedly re-establish and re-initialize the data transport pipeline 350. Additional information is provided in conjunction with FIGS. 4 and 5, below.

Real Time Session in an Analytic Application

Figure 4:
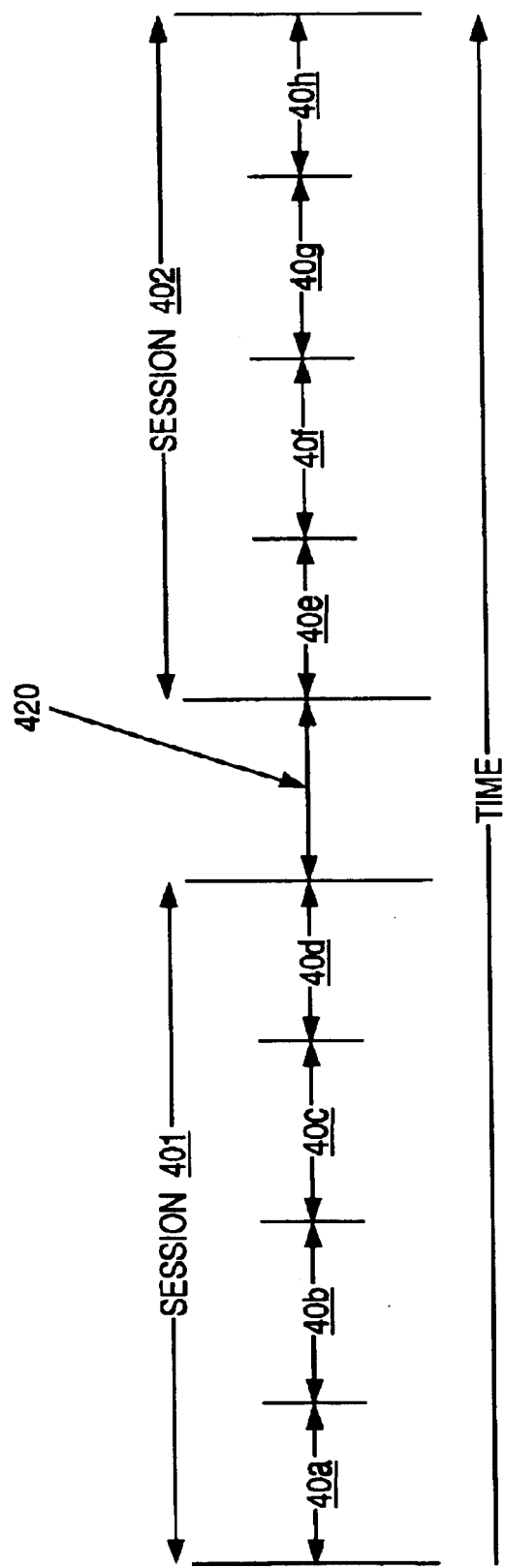
FIG. 4 illustrates the use of a latency time period in a real time session in accordance with one embodiment of the present invention.

FIG. 4 illustrates the use of a latency time period in a real time session in accordance with one embodiment of the present invention. In the present embodiment, the process of the present invention is predicated on the specification of a latency time period.

FIG. 4 shows two sessions 401 and 402 for executing a data transport pipeline 350 (FIG. 3). In session 401, a latency time period is specified, in effect dividing session 401 into a series of contiguous time intervals 40a–40d. At the end of each latency time period, data are read from a source database (e.g., operational databases 316a–c of FIG. 3), transformed according to a transformation operation, and written (or committed) to a target database (e.g., target databases 313a–b of FIG. 3). In other words, at the end of each latency time period 40a–d, the pipeline is "flushed," and the data accumulated during the latency time period are passed along (committed) and transformed into the target data set. When one latency time period is completed, the next one begins. Thus, the target database is updated at the end of each latency time period. Session 401 and data transport pipeline 350 continue to run at the end of each latency time period; that is, they are persisted even though the data transport operations have been executed. In contrast, in the batch mode of operation, data transport pipeline 350 is terminated after it is executed.

In the real time mode, there is no "end of data" because the data are trickled through the data transport pipeline 350 (FIG. 3). Accordingly, in one embodiment, an artificial "end of data" flag (e.g., a commit) is created based on the specified latency time period. That is, in this embodiment, the end of a latency time period is indicated by the presence of an end of data flag. When the end of data flag (commit) is detected, the data accumulated during the most recent latency time period are passed along and transformed into the target data set.

Eventually, real time session 401 of FIG. 4 can be terminated for a period of time (indicated by 420) in response to a triggering event. The triggering event may be a manual shutdown initiated by a user. The triggering event may also be an automatic shutdown initiated because no new data are being received. Session 401 can also be terminated after a specified number of messages are received from message system 305 (FIG. 3). There may be other reasons why a session is terminated for a period of time.

Real time sessions can also be started and stopped with minimum delay. When real time session 401 is completed, a check is performed to see if the session needs to be rescheduled and, if so, the session is rescheduled as session 402 per an existing scheduling policy. For real time sessions, in one embodiment, the next session (e.g., session 402) is scheduled to be run immediately. In another embodiment, the length of the interval 420 can be specified by a user, and the next session (e.g., session 402) is scheduled to run after interval 420 expires.

A real time session can be performed in parallel with a batch session (that is, multiple sessions can occur in parallel, and one of these sessions may be a real time session and another one a batch session). Real time transformations can be automatically initiated when a session starts; that is, when a transformation operation is to begin, any real time session in the repository is scheduled to immediately run.

Figure 5:
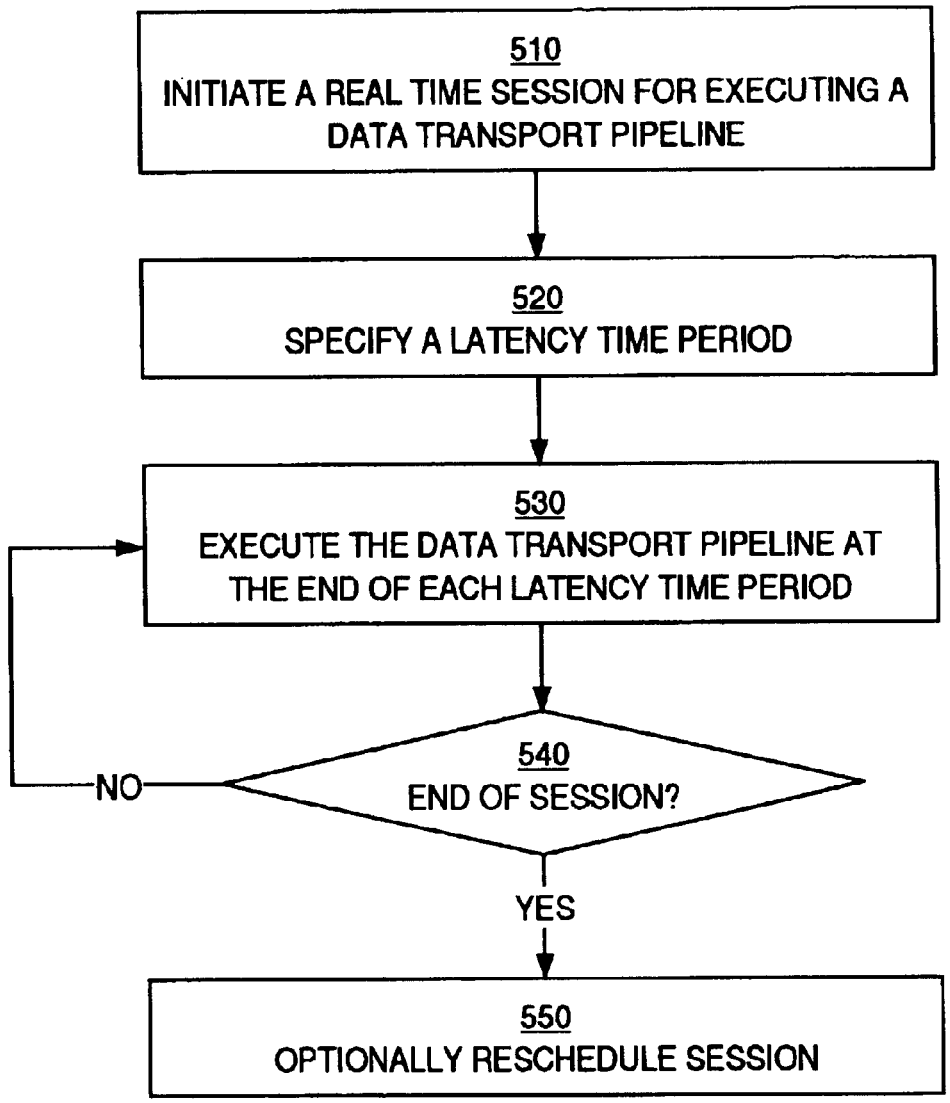
FIG. 5 is a flowchart of the steps in a process for incrementally transforming in real time a dynamically changing operational database in accordance with one embodiment of the present invention.

FIG. 5 is a flowchart of the steps in a process 500 for incrementally transforming in real time a dynamically changing operational database in accordance with one embodiment of the present invention. In this embodiment, process 500 is implemented by computer system 290 (FIG. 2) as computer-readable program instructions stored in a memory unit (e.g., ROM 203, RAM 202 or data storage device 204 of FIG. 2) and executed by a processor (e.g., processor 201 of FIG. 2). Although the steps in process 500 are described in a certain order, it is appreciated that the steps may be performed in a different order.

In step 510 of FIG. 5, a real time session (e.g., session 401 of FIG. 4) is initialized. In one embodiment, the user specifies that session 401 is to be a real time session (as opposed to a batch session).

In one embodiment, session 401 is for executing data transport pipeline 350 of FIG. 3. Data transport pipeline 350 performs data extraction, transformation, and loading tasks as described above.

In step 520 of FIG. 5, in the present embodiment, the length of a latency time period is specified. As will be seen, the latency time period is used to drive data through data transport pipeline 350 in the real time mode in accordance with the present invention.

In step 530 of FIG. 5, the data transport pipeline 350 (FIG. 3) is executed at the end of each latency time period. For example, with reference also to FIG. 4, operational (raw) data are accumulated prior to and/or from the beginning of session 401. That is, data can also be accumulated during latency time period 40a. In one embodiment, the data are received from message system 305 of FIG. 3.

At the end of latency time period 40a, the accumulated data are flushed through data transport pipeline 350. That is, the data transport operations—extraction of data from the operational database(s), transformation of the data, and loading of the transformed data into target database(s)—are executed during the first latency time period 40a.

Because the data are in effect trickled through data transport pipeline 350, in one embodiment, the end of a latency time period is indicated by the presence of an end of data flag. When the end of data flag (commit) is detected, the data accumulated during the most recent latency time period are passed along (committed) and transformed into the target data set.

The end of latency time period 40a marks the beginning of the next latency time period 40b. New data are accumulated during latency time period 40b, and at the end of that time interval, the data transport operations of data transport pipeline 350 are again executed. This process is repeated at the end of each latency time period until session 401 is terminated (step 540).

In step 550 of FIG. 5, a follow-on session 402 (FIG. 4) for executing data transport pipeline 350 (FIG. 3) can optionally be scheduled and initiated.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for performing a real time session in an analytic application, said method comprising:

initializing a session, said session identified as a real time session, said real time session for repeatedly executing a data transport pipeline of said analytic application;

specifying the length of a time interval;

accumulating data in a source database during said time interval;

executing said data transport pipeline each time said time interval expires, wherein said data accumulated in said source database during the most recent time interval are transformed according to said data transport pipeline and passed from said data transport pipeline to a target database; and persisting said data transport pipeline after each execution of said data transport pipeline until said real time session is completed.

2. The method as recited in claim 1 wherein said data are transformed according to a transformation operation, wherein said transformation operation is a source operation, a target operation, an expression operation, an aggregation operation, a filter operation, a rank operation, an update strategy operation, a sequence operation, a joiner operation, a lookup operation, a stored procedure operation, an external procedure operation, or a normalizer operation.

3. The method as recited in claim 1 wherein data in said source database are received from a messaging system coupled to said data transport pipeline.

4. The method as recited in claim 1 wherein said executing comprises measuring elapsed time; and executing said data transport pipeline automatically when said elapsed time is equal to said time interval.

5. The method as recited in claim 1 wherein a flag is used to indicate the end of said time interval, wherein said flag is for indicating data accumulated during said time interval are to be processed according to said data transport pipeline.

6. The method as recited in claim 1 wherein said real time session is automatically terminated in response to a triggering event.

7. A computer system comprising:

a bus;

a processor coupled to said bus; and a memory unit coupled to said bus, said processor for executing a method for performing a real time session in an analytic application, said method comprising:

initializing a session, said session identified as a real time session, said real time session for repeatedly executing a data transport pipeline of said analytic application;

specifying the length of a time interval;

accumulating data in a source database during said time interval;

executing said data transport pipeline each time said time interval expires, wherein said data accumulated in said source database during the most recent time interval are transformed according to said data transport pipeline and passed from said data transport pipeline to a target database; and persisting said data transport pipeline after each execution of said data transport pipeline until said real time session is completed.

8. The computer system of claim 7 wherein said data are transformed according to a transformation operation, wherein said transformation operation is a source operation, a target operation, an expression operation, an aggregation operation, a filter operation, a rank operation, an update strategy operation, a sequence operation, a joiner operation, a lookup operation, a stored procedure operation, an external procedure operation, or a normalizer operation.

9. The computer system of claim 7 wherein data in said source database are received from a messaging system coupled to said data transport pipeline.

10. The computer system of claim 7 wherein said executing comprises:

measuring elapsed time; and executing said data transport pipeline automatically when said elapsed time is equal to said time interval.

11. The computer system of claim 7 wherein a flag is used to indicate the end of said time interval, wherein said flag is for indicating data accumulated during said time interval are to be processed according to said data transport pipeline.

12. The computer system of claim 7 wherein said real time session is automatically terminated in response to a triggering event.

13. A computer-usable medium having computer-readable program code embodied therein for causing a computer system to perform a method for incrementally transforming in real time a dynamically changing operational database in an analytic application, said method comprising:

initializing a session, said session identified as a real time session, said real time session for repeatedly executing a data transport pipeline of said analytic application;

specifying the length of a time interval;

accumulating data in a source database during said time interval;

executing said data transport pipeline each time said time interval expires, wherein said data accumulated in said source database during the most recent time interval are transformed according to said data transport pipeline and passed from said data transport pipeline to a target database; and persisting said data transport pipeline after each execution of said data transport pipeline until said real time session is completed.

14. The computer-usable medium of claim 13 wherein said data are transformed according to a transformation operation, wherein said transformation operation is a source operation, a target operation, an expression operation, an aggregation operation, a filter operation, a rank operation, an update strategy operation, a sequence operation, a joiner operation, a lookup operation, a stored procedure operation, an external procedure operation, or a normalizer operation.

15. The computer-usable medium of claim 13 wherein data in said source database are received from a messaging system coupled to said data transport pipeline.

16. The computer-usable medium of claim 13 wherein said computer-readable program code embodied therein causes a computer system to perform said method comprising:

measuring elapsed time; and executing said data transport pipeline automatically when said elapsed time is equal to said time interval.

17. The computer-usable medium of claim 13 wherein a flag is used to indicate the end of said time interval, wherein said flag is for indicating data accumulated during said time interval are to be processed according to said data transport pipeline.

18. The computer-usable medium of claim 13 wherein said real time session is automatically terminated in response to a triggering event.

* * * * *